United States Patent Office 3,658,838
Patented Apr. 25, 1972

3,658,838
PROCESS FOR THE PREPARATION OF 1,5-DI-SUBSTITUTED-4-CYANO-PYRAZOLES
Hartmut Kiehne and Siegfried Petersen, Leverkusen, Germany, assignors to Farbenfabriken Bayer Aktiengesellschaft, Leverkusen, Germany
No Drawing. Filed Nov. 10, 1969, Ser. No. 875,490
Claims priority, application Germany, Nov. 16, 1968,
P 18 09 386.2
Int. Cl. C07d *49/18*
U.S. Cl. 260—310 R     16 Claims

ABSTRACT OF THE DISCLOSURE

Reacting a derivative of a β-keto-nitrile with a substituted hydrazine or the corresponding acid salt thereof;
I.e. an enol ether or enamine of β-ketonitrile such as (alkoxy-, alkylamino- and phenylamino-methylene)-(optionally halo, trifluoromethyl, alkyl and/or alkoxy substituted-benzoyl, and furoyl)-acetonitrile; with (optionally hydroxy and cyano substituted-alkyl; cycloalkyl; optionally chloro, nitro, alkyl and/or dialkylsulfonamido substituted-phenyl; and phenyl-alkyl)-substituted hydrazine, or the corresponding salt thereof;
In the presence of a carboxylic acid at an elevated temperature, e.g. 40–150° C., optionally in the presence of an inert solvent;
To form the corresponding 1,5-disubstituted-4-cyano-pyrazole; i.e. 1-(optionally hydroxy and cyano substituted-alkyl; cycloalkyl; optionally chloro, nitro, alkyl and/or dialkylsulfonamido substituted-phenyl; and phenyl-alkyl)-4-cyano - 5 - (optionally halo, trifluoromethyl, alkyl and/or alkoxy substituted-phenyl, and furyl)-pyrazoles; some of which are known and all of which are fungicides and intermediates for the preparation of crop protection agents and pesticides.

---

The present invention relates to and has for its objects the provision for particular new methods of reacting a derivative of a β-keto-nitrile with a substituted hydrazine or the corresponding acid salt thereof;
I.e. an enol ether or enamine of β-ketonitrile such as (alkoxy-, alkylamino- and phenylamine-methylene)-(optionally halo, trifluoromethyl, alkyl and/or alkoxy substituted-benzoyl, and furoyl)-acetonitrile; with (optionally hydroxy and cyano substituted-alkyl; cycloalkyl; optionally chloro, nitro, alkyl and/or dialkylsulfonamido-substituted-phenyl; and phenyl-alkyl)-substituted hydrazine, or the corresponding salt thereof;
In the presence of a carboxylic acid at an elevated temperature, e.g. 40–150° C., optionally in the presence of an inert solvent;
To form the corresponding 1,5 - disubstituted-4-cyano-pyrazole; i.e. 1-(optionally hydroxy and cyano substituted-alkyl; cycloalkyl; optionally chloro, nitro, alkyl and/or dialkylsulfonamidosubstituted-phenyl; and phenyl-alkyl)-4-cyano - 5 - (optionally halo, trifluoromethyl, alkyl and/or alkoxy substituted-phenyl, and furyl)-pyrazoles; some of which are known and all of which are fungicides and intermediates for the preparation of crop protection agents and pesticides; e.g. in an overall single step reaction, using readily available or producible starting materials whereby to attain outstanding yields and high purity, with other and further objects of the invention becoming apparent from a study of the within specification and accompanying examples.

It is known that 4-cyano-5-phenyl-pyrazole of the formula

(A)

is obtained when anilinomethylene-benzoyl-acetonitrile (IIa) is reacted with unsubstituted hydrazine hydrate (B) in the presence of a solvent [see J. Amer. Chem. Soc. 58, 1334–1336 (1936)]:

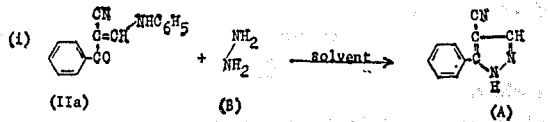

It is also known that when anilinomethylene-benzoyl-acetonitrile (IIa) is reacted with phenylhydrazine (IIIa), that is, a substituted hydrazine, in the presence of a solvent, there is obtained, not 1,5-diphenyl-4-cyano-pyrazole of the formula

(1a₁)

but instead, as a result of a completely different mode of reaction, 1-phenyl-4-benzoyl-5-amino-pyrazole of the formula

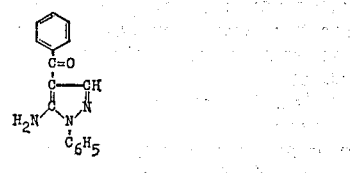

(C)

[compare J. Amer. Chem. Soc. 58, 1334–1336 (1936), corrected by Tetrahedron Letters 1966 (16), 1739–1744]:

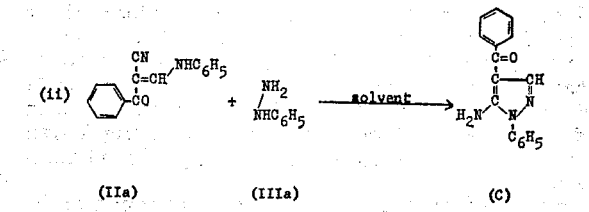

It is also known [see Tetrahedron Letters 1966 (16), 1739–1744] that 1,5-diphenyl-4-cyano-pyrazole (1d₂) is obtained by condensation of oxalic acid monoethyl ester (β-phenylhydrazide)-chloride, which must first be prepared in a multi-step process [compare Berichte 27, 320–322 (1894)], with ω-cyano-acetophenone to give 1,5-diphenyl-3-carbethoxy-4-cyano-pyrazole and subsequent hydrolysis and decarboxylation.

It has now been found, in accordance with the present invention, that a versatile and smooth process may now be provided for the production in favorable yields and high purity of 1,5-disubstituted 4-cyano-pyrazoles, some of which are known and all of which possess fungicidal properties and are intermediates for the preparation of crop protection agents and pesticides, of the formula $$\underset{X}{\underset{|}{Y-}}\overset{CN}{\underset{N}{\bigcirc}}N \qquad (Ia)$$

in which

X is alkyl of 1–12 carbon atoms, hydroxy-alkyl of 1–12 carbon atoms, cyano-alkyl of 1–12 carbon atoms, cycloalkyl of 5–6 carbon atoms, phenyl, substituted phenyl which is substituted with 1–2 substituents such as chloro, nitro, alkyl of 1–4 carbon atoms and/or dialkyl-sulfonamido having 1–4 carbon atoms in each alkyl moiety, or phenyl-alkyl having 1–2 carbon atoms in the alkyl moiety; and Y is phenyl, substituted phenyl which is substituted with 1–4 substituents such as chloro, bromo, fluoro, trifluoromethyl, alkyl of 1–4 carbon atoms and/or alkoxy of 1–4 carbon atoms, or furyl;

which comprises reacting a derivative of a β-keto-nitrile of the formula $$Y-CO-\underset{\underset{CHR}{\parallel}}{C}-CN \qquad (II)$$

in which

Y is the same as defined above, and

R is alkoxy of 1–4 carbon atoms, alkylamino having 1–4 carbon atoms in the alkyl moiety, or phenylamino, with a monosubstituted hydrazine of the formula $$X-NHNH_2 \qquad (III)$$

in which

X is the same as defined above, or the corresponding acid salt thereof, in the presence of a carboxylic acid at an elevated temperature.

In accordance with copending U.S. application Ser. No. 875,491, filed Nov. 10, 1969 in the names of Hartmut Kiehne, Siegfried Petersen, Ingeborg Hammann and Gunter Unterstenhofer, those compounds, obtainable in accordance with the production process of the present invention, which are new are disclosed and claimed as also being insecticidally and acaricidally active compounds.

It is a distinct advantage of the present invention that by means of the instant process technique, it is possible to prepare compounds of Formula Ia in a single step reaction and with good yields and purity, an accomplishment heretofore unachievable.

It is very surprising that in the reaction according to the present invention in analogy with formula scheme (ii) above there are obtained not reaction products of the type of those of Formula C above, but, with a smooth reaction, just products of the type of Formula 1a above, that is 1,5-disubstituted 4-cyano-pyrazoles of Formula 1a above. It could not have been foreseen that the addition of a carboxylic acid would deviate the previously known reaction course so as to take a completely different direction.

It is significant that the deviation of the course of the reaction from one leading to products of the type of Formula C above to one leading to the formation of products of the type of Formula 1a above cannot be effected when, instead of the carboxylic acids used according to the present invention, either sulfonic acids or mineral acids are added. There is thus no doubt that it is not the pH value which is decisive. The carboxylic acids, as determined in accordance with the present invention, have a specific effect on the reaction.

Advantageously, the production process according to the instant reaction makes the 1,5-di-substituted 4-cyano-pyrazoles of Formula Ia above accessible in simple manner and therefore represents a valuable enrichment of the art.

When starting with ethoxymethylene-benzoyl-acetonitrile and phenyl-hydrazine, the production reaction according to the present invention can be represented by the following formula scheme:

$$\underset{(IIb)}{\underset{\phi}{\overset{CN}{\underset{CO}{C=CH}}}\overset{OC_2H_5}{}} + \underset{(IIIa)}{\underset{\phi}{HN-H_2N}} \xrightarrow{\text{carboxylic acid}} \underset{(Ia_3)}{\underset{\phi}{\overset{CN}{\underset{N}{C-CH}}\underset{N}{\overset{H}{\parallel}}N}} + H_2O + C_2H_5OH$$

Advantageously, in accordance with the present invention, in the various formulae herein:

X represents

Straight and branched chain alkyl hydrocarbon of 1–12 carbon atoms such as methyl, ethyl, n- and iso-propyl, n-, iso-, sec.- and tert.-butyl, n- and iso-amyl, n- and iso-hexyl, n- and iso-heptyl, n- and iso-octyl, nonyl, decyl, undecyl, dodecyl, and the like, especially lower alkyl, and more especially $C_{1-4}$ or $C_{1-3}$ or $C_{1-2}$ alkyl;

Straight and branched chain hydroxyalkyl of 1–12 carbon atoms such as hydroxy-methyl to dodecyl inclusive, and the like, as defined above, especially hydroxy-lower alkyl, and more especially hydroxy-$C_{1-4}$ or $C_{1-3}$ or $C_{1-2}$ alkyl;

Straight and branched chain cyanoalkyl of 1–12 carbon atoms such as cyano-methyl to dodecyl inclusive, and the like, as defined above, especially cyano-lower alkyl, and more especially cyano-$C_{1-4}$ or $C_{1-3}$ or $C_{1-2}$ alkyl;

Cycloalkyl hydrocarbon of 5–6 carbon atoms such as cyclopentyl, cyclohexyl, and the like, especially cyclohexyl;

Phenyl;

Substituted phenyl which is substituted with 1–2 substituents such as 2-, 3- and 4-mono, and 2,3-, 2,4-, 2,5-, 2,6-, 3,4- and 3,5-di (same or mixed);

Chloro;

Nitro;

Alkyl of 1–4 carbon atoms such as methyl to tert.-butyl inclusive and the like, as defined above, especially $C_{1-3}$ or $C_{1-2}$ alkyl; and/or Dialkyl-sulfonamido having 1–4 carbon atoms in each corresponding alkyl moiety (i.e. di ($C_{1-4}$ alkyl) aminosulfonyl) such as di (same or mixed) methyl to tert.-butyl inclusive, and the like, sulfonamido (i.e.-aminosulfonyl), especially di ($C_{1-3}$ or $C_{1-2}$ alkyl) sulfonamido; or Phenyl-alkyl having 1–2 carbon atoms in the alkyl moiety such as benzyl, phenyl-eth-1-yl, phenyl-eth-2-yl, and the like, especially benzyl;

Y represents

Phenyl;

Substituted phenyl which is substituted with 1–4 substituents such as 2-, 3- and 4- mono; 2,3-, 2,4- 2,5-, 2,6-, 3,4- and 3,5-di; 2,3,4-, 2,3,5-, 2,3,6-, 2,4,5-, 2,4,6- and 3,4,5-tri; and 2,3,4,5-, 2,3,4,6- and 2,3,5,6- tetra (same or mixed);

Chloro;

Bromo;

Fluoro;

Trifluoromethyl;

Alkyl of 1–4 carbon atoms such as methyl to tert.-butyl inclusive, and the like, as defined above, especially $C_{1-3}$ or $C_{1-2}$ alkyl; and/or Alkoxy of 1–4 carbon atoms such as methoxy, ethoxy, n- and iso-propoxy, n-, iso-, sec.- and terti-butoxy, and the like, especially $C_{1-3}$ or $C_{1-2}$ alkoxy; or Furyl such as α- and β-furyl, especially α-furyl; and R represents Alkoxy of 1–4 carbon atoms such as methoxy to tert.-butoxy inclusive, and the like, as defined above, especially $C_{1-3}$ or $C_{1-2}$ alkoxy;

Alkylamino having 1–4 carbon atoms in the alkyl moiety such as methyl to tert.-butyl inclusive, and the like, -amino, especially $C_{1-3}$ or $C_{1-2}$ alkyl-amino; or Phenylamino, i.e. anilino.

Preferably, X is $C_{1-12}$ alkyl; or hydroxy-$C_{1-4}$ alkyl; or cayno-$C_{1-4}$ alkyl; or $C_{5-6}$ cycloalkyl; or phenyl; or chlorophenyl; or nitrophenyl; or ($C_{1-4}$ alkyl)-(di-$C_{1-4}$ alkyl-sulfonamido)-phenyl; or phenyl-$C_{1-2}$ alkyl; Y is phenyl; or mono to tetra-chloro-substituted phenyl; or bromophenyl; or fluorophenyl; or trifluoromethyl-phenyl; or $C_{1-4}$ alkyl-phenyl; or $C_{1-4}$ alkoxy-phenyl; or (dichloro)-($C_{1-4}$ alkoxy)-phenyl; or furyl; and R is $C_{1-4}$ alkoxy; or phenylamino.

In particular, X is $C_{1-12}$ alkyl; or hydroxy-$C_{1-2}$ alkyl; or cyano-$C_{1-2}$ alkyl; or cyclohexyl; or phenyl; or 4-chlorophenyl; or 3-nitro-phenyl; or 2-($C_{1-4}$ alkyl)-5-(di-$C_{1-4}$ alkyl-sulfonamido)-phenyl; or benzyl; Y is phenyl; or mono to tetra chloro-phenyl; or 4-bromo-phenyl; or 4-fluoro-phenyl; or 3-trifluoromethyl-phenyl; or 4-$C_{1-4}$ alkyl-phenyl; or 4-$C_{1-4}$ alkoxy-phenyl; or 2,5-(dichloro)-4-($C_{1-4}$ alkoxy)-phenyl; or furyl; and R is $C_{1-4}$ alkoxy; or phenylamino.

Furthermore, the carboxylic acid is preferably $C_{1-6}$ alkanoic or $C_{2-6}$ alkandioic acid.

The derivatives of the β-keto-nitriles usable as starting materials are clearly characterized by Formula II above.

The starting derivatives of the β-keto-nitriles of Formula II above are only partially known, but they all can readily be prepared. The precursor β-keto-nitriles required for the preparation of these starting compounds are also only partially known.

Such precursor compounds can, however, be readily obtained in known manner, such as by Claisen condensation of suitable carboxylic acid esters, for example benzoic acid esters, with acetonitrile in the presence of the customary basic catalysts or by treatment of α-halo-ketones, for example ω-chloro-acetophenone, with alkali metal cyanides. Suitable precursor β-keto-nitriles include for example benzoyl-acetonitrile, o-, m- and p-chloro-benzoyl-acetonitrile, p-fluoro - benzoyl - acetonitrile, p-bromo-benzoyl-acetonitrile, p-toluol-acetonitrile, p-methoxy-benzoyl-acetonitrile, 2,5-dichloro - 4 - methoxy-benzoyl-acetonitrile, 2,3- and 2,4 - dichloro-benzoyl-acetonitrile, 2,4,5-trichloro-benzoyl-acetonitrile, 2,3,4,5-tetrachloro-benzoyl-acetonitrile, 2-furoylacetonitrile, and the like.

The conversion of the precursor β-keto-nitriles into the enol ethers or enamines of Formula II above can also be carried out by known methods, as the artisan will appreciate, such as by the action of o-formic acid esters, e.g. the ethyl ester, in the presence of acetic anhydride and a trace of zinc chloride at temperatures of 100 to 130° C. or by boiling with an N,N'-dialkyl or diaryl formamidine in an inert solvent, such as toluene, xylene, chlorbenzene, or the like.

It is generally advisable, for carrying out the process of the present invention, to use the enol ethers, since their preparation is less expensive and, in the pyrazole cyclization, they liberate only readily-separable alcohol as well as water. When the enamines are used, upon evaporation of the volatile constituents (as in the case of the enol ethers) a solvent and dilute mineral acid, e.g. HCl, must be added to neutralize the free amine which forms, whereupon the organic phase may be recovered and the solvent evaporated to provide the desired product.

The starting substituted hydrazines usable for the reaction are clearly characterized by Formula III above.

The starting hydrazine may be used either in the form of the free base or in the form of a corresponding carboxylic acid salt, e.g. alkanoic, especially lower or $C_{1-6}$ alkanoic acid salt. Less advisable (although still effective) is the use of a mineral acid salt, e.g. hydrochloric, sulfuric, nitric, phosphoric, etc., acid salt, since this should first, before being combined with the enol ether or enamine of β-keto-acetonitrile of Formula II above, be neutralized with a suitable base, e.g. a corresponding carboxylic acid alkali metal salt, such as lower or $C_{1-6}$ alkanoic acid alkali metal salt, and expediently sodium acetate.

As examples of the substituted hydrazine which can be used (all of which are known), there may be mentioned in particular: methyl-hydrazine, ethyl-hydrazine, n- and iso-propyl-hydrazine, n- and iso-butyl-hydrazine, n-amyl-hydrazine, n-dodecyl-hydrazine, hydroxymethyl-hydrazine, β-hydroxy-ethyl-hydrazine, β-hydroxy-propyl-hydrazine, cyano-methyl-hydrazine, β-cyano-ethyl-hydrazine, cyclopentyl-hydrazine, cyclohexyl-hydrazine, benzyl-hydrazine, 4-tolyl-hydrazine, phenyl-hydrazine, 4-chlorophenyl-hydrazine, 2,4-dichloro-phenyl-hydrazine, 2-nitro-4-chloro-phenyl-hydrazine, 3-nitro-phenyl-hydrazine, 2,4-dinitro - phenyl - hydrazine, 4-(dimethyl-sulfonamido)-phenyl-hydrazine, 2 - methyl-5-(dimethyl-sulfonamido)-phenyl-hydrazine, and the like.

Examples of suitable carboxylic acids, include all fatty acids with 1 to 6 carbon atoms, i.e. $C_{1-6}$ alkanoic acids; simple hydroxycarboxylic acids and lower dicarboxylic acids, i.e. hydroxy-substituted fatty acids and lower alkane dicarboxylic acids, e.g. hydroxy-substituted $C_{1-6}$ alkanoic acids and $C_{2-6}$ alkan-dioic acids; as well as aromatic carboxylic acids, i.e. $C_{6-10}$ aryl carboxylic and hydroxy-carboxylic acids, e.g. phenyl, naphthyl and hydroxy-phenyl carboxylic acids, and mixtures of such acids. There may be mentioned in particular: acetic acid, propionic acid, n- and iso-butyric acid, n- and iso-valeric (i.e. -pentanoic) acid, caproic (i.e. hexanoic) acid, lactic (i.e. 2-hydroxy-propanoic) acid, oxalic acid, malonic (i.e. propanedioic or methane dicarboxylic) acid, succinic (i.e. butanedioic or ethylene dicarboxylic) acid, benzoic acid, salicylic (i.e. o-hydroxy-benzoic) acid, and the like. Of these, acetic acid, which can without disadvantage be used even in technical grade, is generally very suitable.

Liquid carboxylic acids are preferably used undiluted. Such carboxylic acids can, if desired, be diluted (e.g. down to 2 mols of acid per mol of hydrazine) with inert solvents (this term includes mere diluents) such as organic solvents, but such dilution seems to afford no preparative or economic advantage. As solvents or diluents, there may be mentioned aromatic hydrocarbons, especially unsubstituted and lower, e.g. $C_{1-4}$, alkyl-substituted benzenes, such as benzene, toluene and xylene; ethers, especially $C_{4-5}$ cycloaliphatic ethers, such as dioxan and tetrahydrofuran; esters, especially lower, e.g. $C_{1-4}$, alkyl esters of lower, e.g. $C_{2-6}$, alkanoic acids, such as ethyl acetate; and chlorinated hydrocarbons, especially chlorinated aliphatic, e.g. lower aliphatic, and aromatic hydrocarbons, and particularly chlorinated lower alkyl and benzene hydrocarbons, such as methylene chloride, chloroform and chloro-benzene; and the like; as well as water; and mixtures of such solvents.

Solid carboxylic acids may expediently be used in the form of alcoholic solutions, i.e. solutions with lower, e.g. $C_{1-4}$, alkanols.

The carboxylic acid is advantageously used in amounts of substantially between about 1–10, preferably 1.2–3.5, mols per mol of the β-keto-nitrile of Formula II above which is present, whereas such substituted hydrazine is used in amounts of substantially between about 1–2, preferably 1.1–1.5, mols per mol of said β-keto-nitrile of Formula II above which is present.

The reaction temperatures can be varied within a fairly wide range. In general, the work is carried out at from substantially between about 40–150° C., and preferably between about 80–100° C.

When carrying out the production process according to the present invention, it is expedient to provide 1 mol of the starting enol ether or enamine of β-keto-nitrile of Formula II above dissolved or suspended in acetic acid or other carboxylic acid, preferably a 5-fold to 10-fold amount by weight of technical-grade acetic or other carboxylic acid, to add at least 1 mol. preferably approximately 1.1 mols, of the substituted hydrazine of Formula III above (optionally dissolved in a suitable solvent), with stirring and cooling, in such a manner that the temperature in the reaction vessel does not rise above 25° C., and preferably does not rise above 20° C., and then to heat slowly the reaction mixture to about 80–100° C., followed by further stirring at this temperature for 1 to 2 hours and, finally, evaporation of substantially all volatile matter, for example in a vacuum at bath temperatures up to 100° C., after which the reaction mixture frequently solidifies into a slurry of crystals.

When pure starting materials are used, very pure products may thus be obtained, as the artisan will appreciates, even in practically quantitative yield.

To produce an analytical-grade preparation, the crude product may be recrystallized once or twice from a suitable solvent, especially a lower alcohol or benzene/petroleum ether; this operation, however, involves more or less large losses in yield because of the ready solubility of these substances. Occasionally, the crude products show no tendency to crystallize. Here, a purification by distillation in a high vacuum is advisable.

Control dishes to which the active compound preparation has not been added are also set up.

When the nutrient medium has cooled and solidified, the dishes are inoculated with the species of fungi stated in the table below and incubated at about 21° C.

Evaluation is carried out after 4–10 days, dependent upon the speed of growth of the fungi. When evaluation is carried out the radial growth of the mycelium on the treated nutrient media is compared with the growth on the control nutrient media. In the evaluation of the fungus growth, the following characteristic values are used:

0 no fungus growth
1 very strong inhibition of growth
2 medium inhibition of growth
3 slight inhibition of growth
4 growth equal to that of untreated control The particular active compound tested, its concentration and the results obtained can be seen from the following Table 1:

TABLE 1.—MYCELIUM GROWTH TEST

| Active compound | Concentration of active compound in p.p.m. | Cochliobolus miyabeanus | Fusarium dianthi | Pellicularia sasakii | Verticillium alboatrum | Phialophora cinerescens | Cercospora musae | Piricularia oryzae | Botritis cinerea |
|---|---|---|---|---|---|---|---|---|---|
| (2₁) 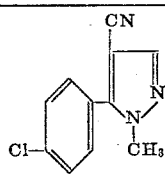 | 50 | 2 | 2 | 2 | 1 | 2 | 0 | 0 | 3 |

The instant 1,5-disubstituted 4-cyano-pyrazoles can be used advantageously as intermediates for the preparation of crop protection agents.

Moreover, these pyrazoles produced according to the present invention themselves exhibit a fungitoxic activity against phytopathogenic fungi. Such compounds can therefore be used as fungitoxic agents in crop protection for the control of phytopathogenic fungi from the most diverse classes of fungi, such as Archimycetes, Phycomycetes, Ascomycetes, Basidiomycetes and Fungi Imperfecti.

Preferably, the instanct compounds are used against parasitic fungi on above-the-soil parts of plants.

Application of the instant active compounds may take place in the usual manner for fungitoxic agents.

The instant compounds further show an anti-microbial activity in industrial disinfection.

The fungitoxic effectiveness of the instant pyrazoles can be seen from the following typical Example 1.

EXAMPLE 1

Mycelium growth test

| Nutrient medium used: | Parts by weight |
|---|---|
| Agar-agar/powdered | 20 |
| Malt extract | 30 |
| Distilled water | 950 |
| Proportion of solvent to nutrient medium: | |
| Acetone (solvent) | 2 |
| Agar nutrient medium | 100 |

The amount of the particular active compound required for the desired final concentration of such active compound in the nutrient medium is mixed with the stated amount of solvent. The resulting concentrate is thoroughly mixed, in the stated proportion, with the liquid nutrient medium (which has been cooled to 42° C.) and is then poured into Petri dishes of 9 cm. diameter.

The following examples are set forth to illustrate, without limitation, the process for producing the instant compounds according to the present invention:

EXAMPLE 2

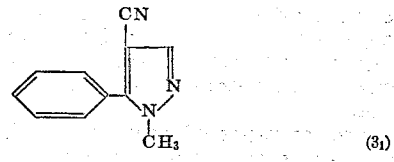 (3₁)

(a) 5 g. (0.11 mol) methyl-hydrazine are added dropwise at 15 to 20° C., with stirring, to a mixture of 20.1 g. (0.10 mol) ethoxymethylene-benzoyl-acetonitrile and 175 ml. of glacial acetic acid. Heating is then effected slowly to 80° C., followed by further stirring at this temperature for about 2 hours. After evaporation of the acetic acid solvent and formed ethanol under reduced pressure, the oily residue is subjected to high vacuum distillation. The main fraction comes over as a viscous, colorless oil which immediately solidifies in the receiver. By recrystallization from a little alcohol, 17 g. 1-methyl-4-cyano-5-phenyl-pyrazole are obtained in the form of colorless crystals of M.P. 59–61° C.

The same product is obtained under otherwise the same conditions when the acetic acid is replaced by propionic acid, butyric acid or valeric acid.

To prove the constitution of the reaction product, such product is hydrolyzed by heating for several hours with excess alcoholic solution of potassium hydroxide (5%) at 160° C. in an autoclave to give the corresponding carboxylic acid, and this is decarboxylated thermally in the presence of copper powder.

A gas-chromatographically homogeneous liquid of B.P. 126–127° C. with a smell similar to that of pyridine is formed which is identical to the 1-methyl-5-phenyl-pyrazole prepared according to another set of instructions [K. V. Auwers and W. Schmidt, Ber. 58, 528–543 (1925)].

(b) The ethoxymethylene-benzoyl-acetonitrile used as starting material can be prepared as follows:

A mixture of 100 g. benzoyl-acetonitrile, 125 g. o-formic acid ethyl ester, 175 g. acetic anhydride and 1–3 g. $ZnCl_2$ is heated to 110–120° C. by means of an oil-bath and all volatile matter is distilled off in this temperature range at normal pressure. When no more volatile matter comes over, cooling to 70–80° C. is effected and the residues of formic acid ester and acetic anhydride are driven over as completely as possible in a water-jet vacuum. The oily, brown residue is triturated with ether, with ice cooling, until the whole mass has crystallized through. The slurry of crystals is filtered off with suction, washed with cold (−10° C.) alcohol, and recrystallized from a little alcohol.

There are thus obtained about 70 g. of yellowish-colored ethoxymethylene-benzoyl-acetonitrile which is pure enough for further reaction. A preparation purified by high-vacuum distillation and subsequent recrystallization from alcohol is completely colorless and melts at 70–72° C.

EXAMPLE 3

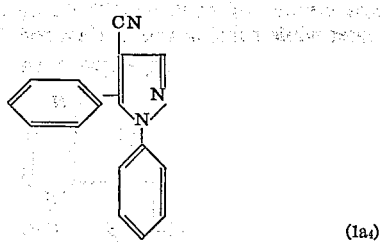

(Ia₄)

12 g. (about 0.11 mol) phenyl-hydrazine are added dropwise at below 20° C. to a mixture of 24.8 g. (0.10 mol) anilino-methylene-benzoyl-acetonitrile and 200 ml. glacial acetic acid, and stirring is then effected for 2 hours at 80° C. After evaporation of the acetic acid, the residue is treated with methylene chloride and dilute hydrochloric acid. The organic phase after being dried over $CaCl_2$ is evaporated to dryness and the residue is recrystallized from alcohol. There are thus obtained 20.5 g. 1,5-diphenyl - 4 - cyano-pyrazole in the form of a colorless crystalline powder of M.P. 100–101° C. These particulars agree with the literature.

EXAMPLE 4

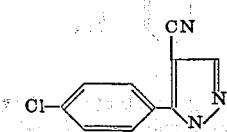

(Ia′)

(a) Compounds of the general Formula Ia′ are obtained when a mixture of 23.6 g. (0.10 mol) ethoxy-methylene-(p-chlorobenzoyl)-acetonitrile of M.P. 102–105° C. and 150–200 ml. glacial acetic acid is reacted as described in Example 2 with at least 0.11 mol of any desired mono-substituted hydrazine. After evaporation of the acetic acid solvent in a vacuum, the reaction product solidifies in most cases into a slurry of crystals, which is filtered off cold with suction and possibly recrystallized from a suitable solvent.

If the crude product lacks the tendency to crystallize, purification takes place by distillation in a high vacuum. In the following Table 2 there are listed a number of typical representatives of the substituted 4-cyano-pyrazoles so obtained:

TABLE 2

| Compound No. | X | M.P. (° C.) | B.P. (° C.) | Solvent for recrystallization |
|---|---|---|---|---|
| (2₁) | —CH₃ | 112–114 | | Alcohol. |
| (4₁) | —C₂H₅ | 114–117 | | Do. |
| (5₁) | n-C₃H₇ | 61–62 | | Benzene/petroleum ether. |
| (6₁) | i-C₃H₇ | 104–105 | | Alcohol. |
| (7₁) | n-C₄H₉ | 76–78 | | Benzene/petroleum ether. |
| (8₁) | n-C₁₂H₂₅ | Oil | ¹ 185–190 | |
| (9₁) | —CH₂CH₂CN | 114 | | Alcohol. |
| (10₁) | ⟨phenyl⟩ | 129–130 | | Do. |
| (11₁) | ⟨phenyl⟩ | 86–87 | | Do. |
| (12₁) | ⟨phenyl⟩ | 144–145 | | Do. |
| (13₁) | ⟨phenyl-NO₂⟩ | 144–146 | | Do. |
| (14₁) | ⟨H₃C-phenyl-SO₂N(CH₃)₂⟩ | 185–186 | | Dimethyl formamide/methanol. |
| (15₁) | ⟨phenyl⟩—CH₂— | Oil | ¹ 170–175 | |

¹ (0.001 mm. Hg).

(b) The ethoxymethylene-(p-chloro-benzoyl)-acetonitrile used as starting material can be obtained like the (unsubstituted in the phenyl radical) compound described in Example 2 by reaction of p-chloro-benzoyl-acetonitrile with o-formic acid ester/acetic anhydride. After being recrystallized twice from alcohol, such starting material melts at 102–105° C. and is somewhat unstable.

EXAMPLE 5

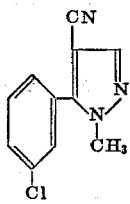

(16₁)

A mixture of 23.6 g. (0.10 mol) ethoxymethylene-(m-chloro-benzoyl)-acetonitrile (B.P. 170–172° C./0.15 mm. Hg) and 175 ml. propionic acid is reacted as described in Example 2 with 5.1 g. (0.11 mol) methyl-hydrazine. After complete evaporation of the propionic acid solvent in a vacuum, there remains behind a viscous oil which, when triturated with a little alcohol, crystallizes through. The well cooled slurry of crystals is filtered off with suction, washed with a little ice-cold alcohol, and dissolved hot in alcohol. After clarification with charcoal, the 1-methyl-4-cyano-5-(m-chloro-phenyl)-pyrazole crystallizes out in colorless, glittering prisms of M.P. 110–112° C. The yield is 20–22 g.

EXAMPLE 6

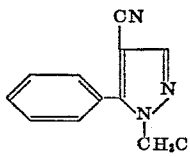

(17₁)

10.7 g. (0.11 mol) β-cyanoethyl-hydrazine are added dropwise, with stirring and cooling, to a mixture of 20.1 g. (0.10 mol) ethoxymethylene-benzoyl-acetonitrile in 150 ml. acetic acid. After stirring for 2 hours at 80° C., working up as described in Example 5 is effected. 15.5 g. of colorless (very readily soluble in alcohol) crystals of 1-(β-cyanoethyl)-4-cyano-5-phenyl-pyrazole are obtained; such crystals are very readily soluble in alcohol. M.P.: 120–122° C. The alcoholic mother liquor can, in order to improve the yield, be concentrated in a vacuum. There are then also obtained 2–3 g. of a less pure product.

EXAMPLE 7

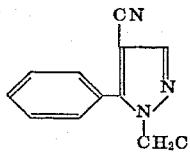

(18₁)

20.1 g. (0.1 mol) ethoxymethylene-benzoyl-acetonitrile in 150 ml. acetic acid are reacted at 80° C. with 8.4 g. (0.11 mol) β-hydroxyethyl-hydrazine. After working up as described in Example 5, 16 g. of almost colorless small needles of 1-(β-hydroxyethyl)-4-cyano-5-phenyl-pyrazole are obtained. M.P.: 102–104° C. (alcohol).

EXAMPLE 8

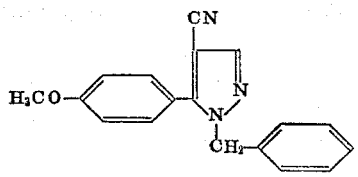

(19₁)

13.4 g. (0.11 mol) benzyl-hydrazine are added dropwise, below 25° C., to a mixture of 23.1 g. (0.10 mol) ethoxymethylene - (p-anisoyl)-acetonitrile and 200 ml. toluene, which contains 15 g. (0.25 mol) acetic acid; stirring is then effected for 2 hours at 80° C. After evaporation of the solvent mixture, there remains behind a viscous oil which shows no tendency to crystallization. By high-vacuum distillation there are obtained 24 g. 1-benzyl-4-cyano-5-(p-anisyl)-pyrazole in the form of an almost colorless, viscous oil which boils at 170–175° C. (0.001 mm. Hg).

EXAMPLE 9

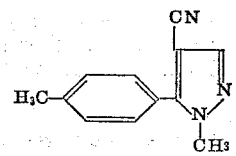

(20₁)

A solution of 21.5 g. (0.10 mol) ethoxymethylene-(p-toluyl)-acetonitrile in 175 ml. dioxan and 18 g. (0.30 mol) acetic acid is reacted as in Example 2 with 5 g. (0.11 mol) methyl-hydrazine. The residue remaining behind after evaporation of the solvent mixture is dissolved with a little alcohol, from which solution 1-methyl-4-cyano-5-(p-tolyl)-pyrazole is separated in almost colorless crystals of M.P. 61–62° C. by careful addition of water while rubbing with a glass rod. The yield is 13.5 g.

EXAMPLE 10

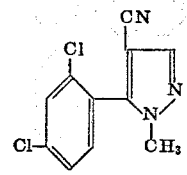

(21₁)

27.0 g. (0.10 mol) ethoxymethylene-(2,4-dichlorobenzoyl)-acetonitrile in 125 ml. n-butyric acid are reacted as described in Example 2 with 5 g. (0.11 mol) methyl-hydrazine. The oily evaporation residue is rubbed with a little alcohol, after which this residue solidifies into a thick slurry of crystals. After recrystallization from alcohol, 24 g. 1-methyl-4-cyano-5-(2′,4′-dichloro-phenyl)-pyrazole are obtained in the form of colorless crystals of M.P. 100–102° C.

EXAMPLE 11

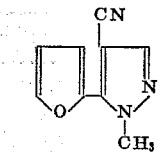

(22₁)

5 g. (0.11) methyl-hydrazine are added dropwise, below 25° C., to a solution of 19.1 g. (0.10 mol) ethoxymethylene-(2-furoyl)-acetonitrile in 300 ml. alcohol which contains also 27 g. (0.10 mol) oxalic acid. After boiling under reflux for two hours, the mixture is largely concentrated in a vacuum and the residue is dissolved in methylene chloride. The solution is extracted with a solution of NaHCO₃, dried over Na₂SO₄, and evaporated in a vacuum. The residue is recrystallized from a little alcohol. There are so obtained 14.5 g. of colorless crystals of 1-methyl-4-cyano-5-(2′-furyl)-pyrazole which melt at 66–67° C.

EXAMPLE 12

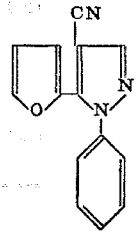

(23₁)

16 g. (0.11 mol) phenyl-hydrazine hydrochloride are introduced, at below 25° C., into a mixture of 19.1 g. (0.10 mol) ethoxymethylene-(2-furoyl)-acetonitrile, 9 g. (0.11 mol) sodium acetate and 150 ml. glacial acetic acid. Stirring is then continued for 2 hours at 80° C., the acetic acid is then largely evaporated off in a vacuum, and the residue is treated with methylene chloride and water. The evaporation residue of the organic phase is rubbed with alcohol. There are thus obtained 21 g. 1-phenyl-4-cyano-5-(2'-furyl)-pyrazole which, after recrystallization from a little alcohol, melts constantly at 131–135° C.

EXAMPLE 13

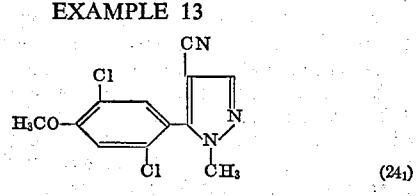

(24₁)

A mixture of 30.0 g. (0.10 mol) ethoxymethylene-(2,5-dichloro-4-methoxy-benzoyl)-acetonitrile and 200 ml. of technical-grade acetic acid is reacted as described in Example 2 with 5.0 g. (0.11 mol) methyl-hydrazine. The slurry of crystals obtained by concentration in a vacuum is filtered off with suction, washed with methanol and dried.

Yield: 27.5 g.

For purification, the product is dissolved in dimethyl formamide and methanol is added. The 1-methyl-4-cyano-5-(2',5'-dichloro-4'-methoxy-phenyl)-pyrazole precipitates in the form of colorless, glittering crystals of M.P. 208–210° C.

EXAMPLE 14

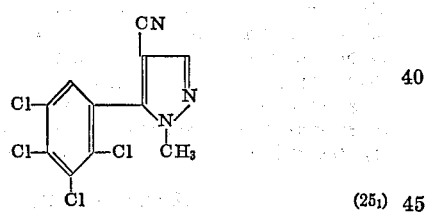

(25₁)

A mixture of 33.9 g. (0.10 mol) ethoxymethylene-(2,3,4,5-tetrachloro - benzyl)-acetonitrile in 200 ml. glacial acetic acid is reacted as described in Example 5 with 5.0 g. (0.11 mol) methyl-hydrazine. After analogous working up, there are obtained, by recrystallization from alcohol, 28.5 g. 1-methyl-4-cyano-5-(2',3',4',5'-tetrachloro-phenyl)-pyrazole of M.P. 203–204° C.

EXAMPLE 15

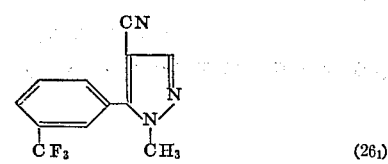

(26₁)

21.3 g. (0.10 mol) m-trifluoromethyl-benzoylacetonitrile of M.P. 58° C. are, as described in Example 2, converted with o-formic acid ethyl ester and acetic anhydride to give the enol ether, which is obtained as a viscous oil. This is dissolved in 175 ml. acetic acid and reacted with 5 g. (0.11 mol) methyl-hydrazine, the same procedure being followed as in Example 5.

There are obtained in this way, after recrystallization from alcohol, 16 g. 1-methyl-4-cyano-5-(m-trifluoromethylphenyl)-pyrazole in the form of beautiful, colorless needles of M.P. 124–125° C.

EXAMPLE 16

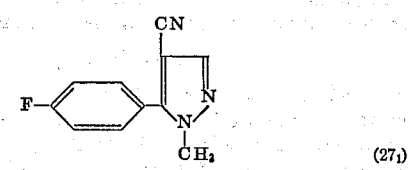

(27₁)

30 g. (0.25 mol) of 50% aqueous acetic acid are added to a mixture of 21.9 g. (0.10 mol) ethoxymethylene-(p-fluorobenzoyl)-acetonitrile and 150 ml. alcohol and then reacted as described in Example 2 with 5 g. (0.11 mol) methyl-hydrazine. After evaporation of the solvent mixture, there remains behind a solid residue which is recrystallized from a little alcohol. There are so obtained 18 g. 1-methyl-4-cyano-5-(p-fluorophenyl)-pyrazole in the form of colorless, glittering prisms of M.P. 125–127° C.

EXAMPLE 17

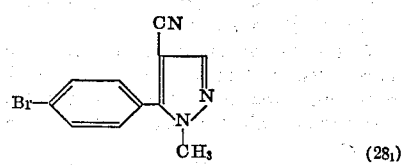

(28₁)

28 g. (0.10 mol) ethoxymethylene-(p-bromo-benzoyl)-acetonitrile are introduced portionwise, with cooling, into a mixture of 150 ml. acetic acid and 7 g. (about 0.15 mol) methyl-hydrazine. After heating to 80° C. for 2 hours, evaporation to dryness is effected in a vacuum. By recrystallization of the solid, crystalline residue, 23 g. 1-methyl - 4 - cyano-5-(p-bromo-phenyl)-pyrazole are obtained in the form of colorless crystals of M.P. 133–135° C.

It will be appreciated that the instant specification and examples are set forth by way of illustration and not limitation, and that various modifications and changes may be made without departing from the spirit and scope of the present invention.

What is claimed is:

1. Process for the production of a 1,5-disubstituted 4-cyano-pyrazole of the formula

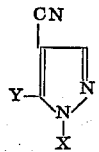

in which X is selected from the group consisting of alkyl of 1–12 carbon atoms; hydroxy-alkyl of 1–12 carbon atoms; cyanoalkyl of 1–12 carbon atoms; cycloalkyl of 5–6 carbon atoms; phenyl; substituted phenyl which is substituted with 1–2 substituents selected from the group consisting of chloro, nitro, alkyl of 1–4 carbon atoms, dialkyl-sulfonamido having 1–4 carbon atoms in each alkyl moiety, and mixtures of such substituents; and phenyl-alkyl having 1–2 carbon atoms in the alkyl moiety; and Y is selected from the group consisting of phenyl; substituted phenyl which is substituted with 1–4 substituents selected from the group consisting of chloro, bromo, fluoro, trifluoromethyl, alkyl of 1–4 carbon atoms, alkoxy of 1–4 carbon atoms, and mixtures of such substituents; and furyl; which comprises reacting of a derivative of a β-ketonitrile of the formula

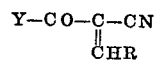

in which Y is the same as defined above; and R is selected from the group consisting of alkoxy of 1–4 carbon atoms, alkylamino having 1–4 carbon atoms in the alkyl moiety and phenylamino; with about 1–2 molar equivalents of a monosubstituted hydrazine of the formula

X—NHNH₂ in which X is the same as defined above, or a salt thereof; in the presence of about 1–10 molar equivalents of a carboxylic acid selected from the group consisting of alkanoic acid of 1–6 carbon atoms, alkanedioic acid of 2–6 carbon atoms, hydroxysubstituted alkanoic acid of 1–6 carbon atoms, and mixtures thereof, at a temperature of about 40 to 150° C. to form the corresponding pyrazole.

2. Process according to claim 1 wherein said carboxylic acid is selected from the group consisting of alkanoic acid of 1–6 carbon atoms and alkanedioic acid of 2–6 carbon atoms.

3. Process according to claim 2 wherein said carboxylic acid is selected from the group consisting of acetic acid, propionic acid, butyric acid, valeric acid and oxalic acid.

4. Process according to claim 3 wherein said carboxylic acid is glacial acetic acid.

5. Process according to claim 1 wherein said monosubstituted hydrazine is used in the form of the corresponding mineral acid salt, and a lower alkanoic acid alkali metal salt is present in the reaction medium to neutralize it.

6. Process according to claim 1 wherein R is alkoxy of 1–4 carbon atoms, and said pyrazole is recovered by evaporating said carboxylic acid and the formed water and alcohol corresponding to R.

7. Process according to claim 1 wherein R is selected from the group consisting of alkylamino having 1–4 carbon atoms in the alkyl moiety and phenylamino, and said pyrazole is recovered by evaporating said carboxylic acid, adding an inert organic solvent and a mineral acid to neutralize the formed amine corresponding to R, recovering the resulting organic phase, and evaporating said solvent.

8. Process according to claim 7 wherein R is phenylamino.

9. Process according to claim 1 wherein said reacting is carried out in the presence of an inert solvent.

10. Process according to claim 9 wherein said reacting is carried out in the presence of an inert solvent selected from the group consisting of water and an inert organic solvent.

11. Process according to claim 10 wherein said reacting is carried out in the presence of an inert organic solvent selected from the group consisting of aromatic hydrocarbons, cycloaliphatic ethers, alkyl esters of alkanoic acids, chlorinated hydrocarbons, mixtures of the foregoing, and alkanols.

12. Process according to claim 11 wherein said reacting is carried out in the presence of an inert organic solvent selected from the group consisting of benzene, alkyl-benzenes, cycloaliphatic ethers containing 4–5 carbon atoms, lower alkyl esters of lower alkanoic acids, chlorinated aliphatic hydrocarbons, chlorinated aromatic hydrocarbons, mixtures of the foregoing, and lower alkanols.

13. Process according to claim 1 wherein one molar equivalent of said derivative of β-keto-nitrile is added to acetic acid, at least one molar equivalent of said substituted hydrazine is added thereto while agitating and cooling so that the temperature does not exceed about 20° C., thereafter the reaction mixture is heated gradually to about 80–100° C. and agitated at such temperature for 1–2 hours, and thereafter the volatile constituents are substantially evaporated at a temperature up to about 100° C.

14. Process according to claim 1 wherein X is selected from the group consisting of alkyl of 1–12 carbon atoms, hydroxy alkyl of 1–4 carbon atoms, cyano alkyl of 1–4 carbon atoms, cycloalkyl of 5–6 carbon atoms, phenyl, chloro-phenyl, nitrophenyl, mono- or di-alkyl sulfonamido-phenyl wherein the alkyls have 1–4 carbon atoms, and phenyl alkyl wherein the alkyl has 1–2 carbon atoms; Y is selected from the group consisting of phenyl, mono to tetra-chloro-phenyl, bromophenyl, fluorophenyl, trifluoromethylphenyl, alkyl-phenyl, alkoxy-phenyl and (dichlooro)-alkoxy-phenyl wherein the alkyl groups have 1–4 carbon atoms, and furyl; and R is selected from the group consisting of alkoxy of 1–4 carbon atoms and phenylamino.

15. Process according to claim 1 wherein X is selected from the group consisting of alkyl of 1–12 carbon atoms, hydroxy-alkyl of 1–2 carbon atoms, cyclohexyl, phenyl and benzyl; Y is selected from the group consisting of phenyl, mono to tetra chloro-phenyl, 4-bromo-phenyl, 4-fluoro-phenyl, 3-trifluoro-methyl-phenyl, 4-alkyl-phenyl, 4-alkoxy-phenyl and 2,5-(dichloro)-4-phenyl wherein the alkyl groups have 1–4 carbon atoms, and furyl; and R is selected from the group consisting of alkoxy of 1–4 carbon atoms and phenylamino.

16. Process according to claim 1 wherein said reacting is carried out at a temperature of about 40–150° C., said carboxylic acid is selected from the group consisting of alkanoic acid of 1–6 carbon atoms and alkanedioic acid of 2–6 carbon atoms, said carboxylic acid is used in an amount of about 1–10 mols per mol of said derivative of β-keto-nitrile and said substituted hydrazine is used in an amount of about 1–2 mols per mol of said derivative of β-keto-nitrile, and said pyrazole is recovered by evaporating the volatile constituents from the reaction mixture.

References Cited

UNITED STATES PATENTS 2,989,539   6/1961   Anderson et al. _____ 260—31 R

OTHER REFERENCES

Grothaus et al., J. Amer. Chem. Soc., vol. 58, pp. 1334–6 (1936).

Fusco et al., Tetrahydron Letters, 1966, No. 16, pp. 1739–44.

NATALIE TROUSOF, Primary Examiner

U.S. Cl. X.R.

260—465 E, 465 F, 347.7, 347.8; 424—273

UNITED STATES PATENT OFFICE
CERTIFICATE OF CORRECTION

Patent No. 3,658,838　　　　　　　　　Dated　April 25, 1972

Inventor(s)　HARTMUT KIEHNE and SIEGFRIED PETERSEN

It is certified that error appears in the above-identified patent and that said Letters Patent are hereby corrected as shown below:

Col. 2, line 54, "(1d$_2$)" should be --(1a$_2$)--; column 4, line 68, "terti-butoxy" should be --tert.-butoxy--; column 5, line 6, "cayno" should be --cyano--; column 7, line 13, "appreciates" should be --appreciate--; columns 9-10, Table 2, compound (12$_1$) " 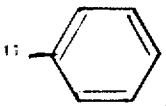 " should be --  -- ; column 14, lines 66 and 67, "substitents" should be --substituents--; column 16, line 20, "(dichlooro)" should be --(dichloro)--

Signed and sealed this 28th day of November 1972.

(SEAL)
Attest:

EDWARD M. FLETCHER, JR.　　　　　　　　　ROBERT GOTTSCHALK
Attesting Officer　　　　　　　　　　　　Commissioner of Patents